US011960363B2

(12) United States Patent
Gupta et al.

(10) Patent No.: US 11,960,363 B2
(45) Date of Patent: Apr. 16, 2024

(54) WRITE OPTIMIZED, DISTRIBUTED, SCALABLE INDEXING STORE

(71) Applicant: Cohesity, Inc., San Jose, CA (US)

(72) Inventors: Apurv Gupta, Bangalore (IN); Akshat Agarwal, Delhi (IN); Manvendra Singh Tomar, Bengaluru (IN); Anshu Avinash, Bengaluru (IN)

(73) Assignee: Cohesity, Inc., San Jose, CA (US)

(*) Notice: Subject to any disclaimer, the term of this patent is extended or adjusted under 35 U.S.C. 154(b) by 227 days.

(21) Appl. No.: 17/020,254

(22) Filed: Sep. 14, 2020

(65) Prior Publication Data

US 2021/0089407 A1    Mar. 25, 2021

Related U.S. Application Data

(60) Provisional application No. 62/904,561, filed on Sep. 23, 2019.

(51) Int. Cl.
*G06F 11/14* (2006.01)
*G06F 11/07* (2006.01)

(52) U.S. Cl.
CPC ...... *G06F 11/1464* (2013.01); *G06F 11/0772* (2013.01); *G06F 11/1435* (2013.01); *G06F 11/1451* (2013.01); *G06F 11/1469* (2013.01)

(58) Field of Classification Search
CPC .......................... G06F 11/1464; G06F 11/1451
See application file for complete search history.

(56) References Cited

U.S. PATENT DOCUMENTS

| 10,747,739 | B1* | 8/2020 | Muniswamy Reddy ........ G06F 16/27 |
| 10,795,910 | B2* | 10/2020 | Guo ........................ G06F 16/27 |
| 2003/0195866 | A1* | 10/2003 | Long ........................ H04L 67/06 707/999.001 |
| 2015/0261461 | A1* | 9/2015 | Li ........................ G06F 11/1471 711/135 |
| 2016/0048529 | A1* | 2/2016 | Mathur ................ G06F 16/128 707/662 |
| 2016/0127465 | A1* | 5/2016 | Barstow ............... G06F 16/273 707/620 |
| 2016/0147671 | A1* | 5/2016 | Vishne .................. G06F 12/12 711/135 |

(Continued)

OTHER PUBLICATIONS

Lamping et al., "A fast, minimal memory, consistent hash algorithm." arXiv preprint arXiv:1406.2294 (2014).

*Primary Examiner* — Pierre M Vital
*Assistant Examiner* — Jedidiah P Ferrer
(74) *Attorney, Agent, or Firm* — Shumaker & Sieffert, P.A.

(57) ABSTRACT

A mechanism for storing indexing updates is described. A secondary storage system is configured to store a backup of a primary storage system. A plurality of different indexing updates of a data repository associated with the secondary storage system is received. An indexing update may include metadata and/or updates to the metadata for a data item in the backup. The indexing updates may be obtained from an indexing process. At least a portion of the indexing updates are sent for storage in an intermediate store. An indication to commit the indexing updates is received. In response, the indexing updates including the at least the portion of the indexing updates are requested to be committed. The indexing updates batched together into a batch to be committed to a metadata store.

22 Claims, 8 Drawing Sheets

(56) References Cited

U.S. PATENT DOCUMENTS

| | | | |
|---|---|---|---|
| 2016/0203168 A1* | 7/2016 | Gangadharappa | G06F 16/27 |
| | | | 707/696 |
| 2019/0361780 A1* | 11/2019 | Tiwari | G06F 11/1458 |
| 2020/0104523 A1* | 4/2020 | Theimer | G06F 16/172 |
| 2020/0125656 A1* | 4/2020 | Li | G06F 11/1469 |
| 2020/0192805 A1* | 6/2020 | Keymolen | G06F 3/0647 |

* cited by examiner

WRITE OPTIMIZED, DISTRIBUTED, SCALABLE INDEXING STORE

CROSS REFERENCE TO OTHER APPLICATIONS

This application claims priority to U.S. Provisional Patent Application No. 62/904,561 entitled WRITE OPTIMIZED, DISTRIBUTED, SCALEABLE INDEXING STORE filed Sep. 23, 2019 which is incorporated herein by reference for all purposes.

BACKGROUND OF THE INVENTION

A primary storage system may include data items, such as files and emails, that are backed up to a secondary storage system. Because the primary storage system is backed up periodically, the data items may be present in multiple backups. Further, different versions of a particular data item may be present in different backups. For example, a file on the system may exist during processing of a first backup of the system and during processing of a second backup of the system. The file is present in both the first and the second backups. The file may also have been modified in the time between processing of the first backup and processing of the second backup. Thus, multiple versions of the file may be present in different backups. In order to utilize the backups, it may be desirable to locate a particular version of a file in the backups. Searching contents of each backup every time a specific desired data item is desired to be restored would be inefficient.

BRIEF DESCRIPTION OF THE DRAWINGS

Various embodiments of the invention are disclosed in the following detailed description and the accompanying drawings.

DETAILED DESCRIPTION

Figure 1A:
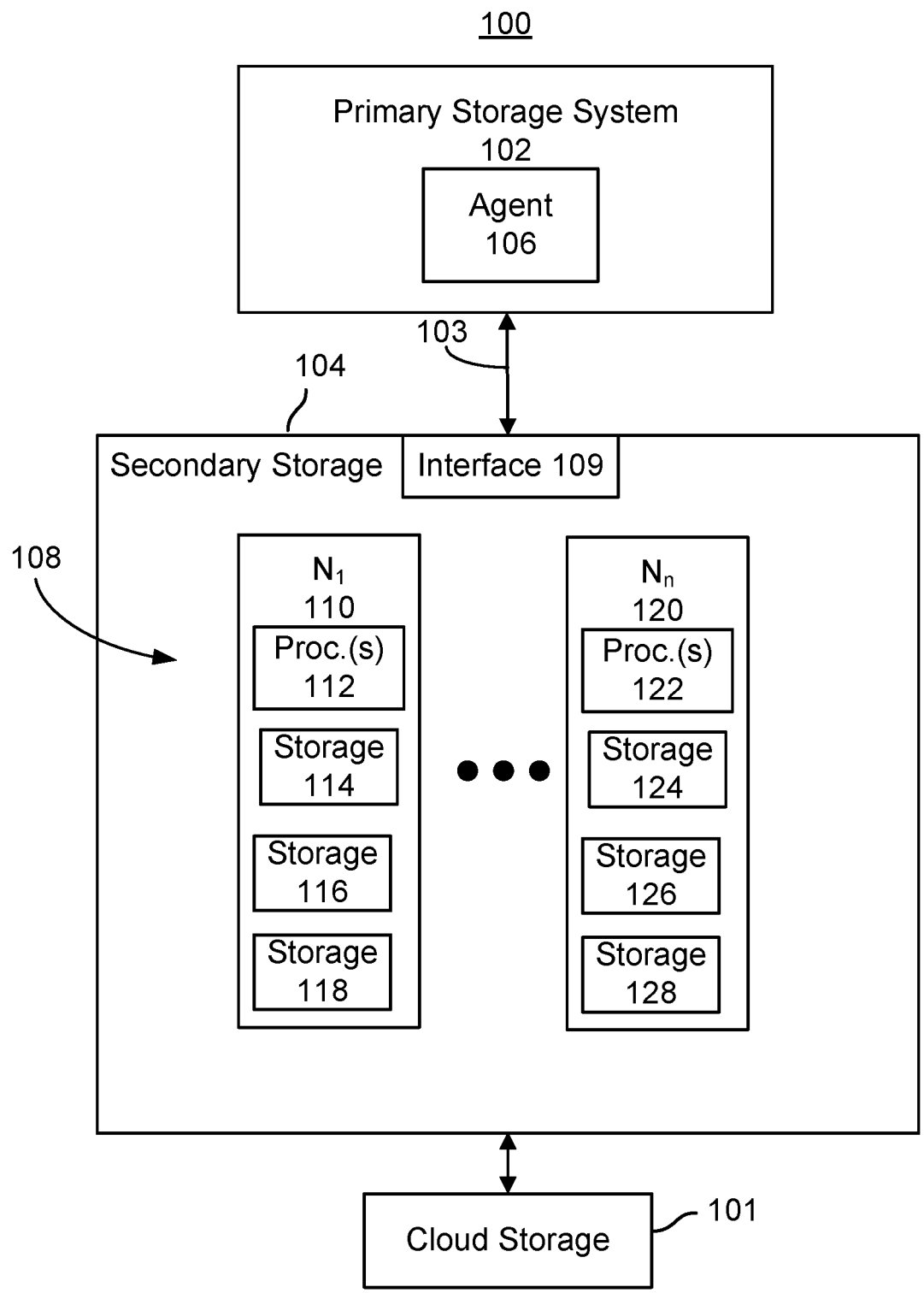
FIGS. 1A-1C are diagrams depicting an exemplary embodiment of a distributed storage system capable of indexing metadata for data items and storing metadata.

Metadata for the data items in backups can be collected and stored in a metadata store. Rather than directly searching the backups for a desired version of a data item, the more compact metadata store can be efficiently searched to locate information about the desired version of the data item and the corresponding backup may be found more rapidly. Thus, the use of metadata allows for improved search and later recovery of data items. Metadata for a data item in a backup includes information related to the data item and to the backup. For example, the metadata for the data item may include the name of the data item, the size of the data item, the last time the data item was modified, version information, the corresponding backup, other information related to the data item and/or the backup, or combinations thereof. Searching the metadata allows for improved use of the backup. For example, a search of the metadata enables the efficient location of the desired version of the data item and corresponding backup. Searching the metadata is more efficient that searching through multiple backups and thus enables improved search and recovery of data items.

In order to obtain the metadata for data items in a backup, an indexing process may be used. The indexing process collects metadata and updates to the metadata for data items that have been backed up. The metadata for each data item is also stored in a metadata store. Although this process allows metadata for data items in backups to be stored, it may be inefficient. A large number of data items can be stored in each backup. For example, an object such as a virtual machine (VM) may have a million or more files to be processed for each backup. A network attached storage device (NAS) may have a billion or more data items to be backed up. Over time, backups continue to be performed and the number of data items backed up typically increases. Consequently, individually storing metadata collected for each data item in the indexing process may result in an extremely large number of updates to the metadata store for each backup. Furthermore, to store the metadata, multiple stable writes of the metadata may be used. For example, a write-ahead log can be utilized. In this case, metadata may first be stably written to the log, and later stably written a second time to the metadata's final location. Thus, two stable writes may be used for each update to each item of metadata. Such a process for storing metadata for data items may be inefficient, consuming both time and computing resources.

A mechanism for storing metadata in a metadata store is described. Metadata is data about a data item. In an embodiment, metadata does not comprise a full copy of the data item; examples of metadata of a data item such as a file can comprise the size of the file, a reference to the creator of the file, etc. In some embodiments, a secondary storage system is configured to store a backup of a primary storage system. Metadata of a backup stored in a secondary system's data repository may be indexed, for example, by an indexing client. An indexing update may include metadata and/or updates to the metadata for a data item in a backup and may be obtained from an indexing process to index the data items in the backup. In some embodiments, each of the indexing updates includes complete or incremental changes, if any, to the latest listing of files of the data repository. A full indexing update includes at least a portion of the metadata for all data items. An incremental indexing update includes at least a portion of the metadata for data items which are new or changed compared to a previous indexing update. In some embodiments, a plurality of different indexing updates of the data repository associated with a secondary storage system are received at a metadata store client from an indexing client. At least a portion of the different indexing updates may be sent for storage in an intermediate store. Over time, multiple different groups, each comprising different indexing updates, may be sent for storage in the intermediate store. The intermediate store may be part of the metadata store. An indication to commit the indexing updates may be received at the metadata store client from the indexing client. In response, any outstanding indexing updates may be sent by the metadata store client to a metadata store manager for storage in the intermediate store. In addition, a request to commit the indexing updates may be provided from the metadata store client to the metadata store manager. Indexing updates, which may include multiple groups of updates, which have been stored at the intermediate store are batched together into a batch to be committed to the metadata store.

Batching places multiple indexing updates together in a batch such that an update is considered successfully committed only if all of the updates in its batch are successfully committed to the metadata store. The batch is considered successfully committed if all of the indexing updates in the batch are successfully committed to the metadata store. A request to commit the batch may be sent to a metadata store (e.g., metadata store maintains the metadata of data items of the data repository and allows fast search and identification of data items of the data repository).

For example, the indexing process may operate on data items found in a snapshot which is stored in a secondary storage system's repository. For each data item, indexing updates may include information such as snapshot version number, data item size, data item name, changes in data item size, and/or last time of modification of the data item are collected. An indexing update may include new metadata for data items not previously backed up, changes to existing data items which were previously backed up, or both. In an example, the indexing process may be performed by one or more indexing clients. These indexing updates obtained in the indexing process may be received at a metadata store client from the indexing client. These indexing updates may be grouped together and sent as groups from the metadata store client to the metadata store manager. The metadata store manager provides the indexing updates to the intermediate store for temporary storage. Grouping the updates and sending them as a group to the intermediate store is more efficient than sending each small indexing update individually. In addition, an indication to commit the indexing updates may be received from the indexing client. In some embodiments, the indication to commit sent from the indexing client is received at the metadata store client. In some embodiments, the indication to commit may be a request to commit indexing updates. In other embodiments, the indication to commit may take another form, such as a notification that the indexing process has been completed for all data items in a directory or a notification that a particular time interval has expired.

In response to the indication to commit, any remaining indexing updates may be sent from the metadata store client to the metadata store manager for storage in the intermediate store. For example, remaining indexing updates may comprise indexing updates sent from the indexing client to the metadata store client before the indexing client sent the indication to commit but which have not yet been sent to the metadata store manager for storage in the intermediate store. In addition, a request to commit the indexing updates is provided to the metadata store manager. In some embodiments, a request to commit indexing updates is provided from the metadata store client to the metadata store manager. To commit the indexing updates to the metadata store, the indexing updates in the intermediate store may be batched and committed together. In some embodiments, all of the indexing updates in a batch may be held in the intermediate store until a request to commit is received at the metadata store manager, and then committed at the metadata store. In some embodiments, a subset of the indexing updates of a batch at the intermediate storage may undergo an early commit to the metadata store, before a request to commit is received at the metadata store manager. Thus, some indexing updates may be committed to the metadata store before a request to commit is received at the metadata store manager. In this case, responsive to receiving, at the metadata store manager, a request to commit the indexing updates, the indexing updates remaining at the intermediate store which have not yet been committed are committed to the metadata store as part of the batch. In some embodiments, the batch includes all of the indexing updates sent by the indexing client to the metadata client between indications to commit, regardless of whether some (or all) of the indexing updates are committed early.

Thus, indexing updates stored in the intermediate store may be committed to the metadata store. The metadata store maintains the metadata of data items of the data repository and allows fast search and identification of data items of the data repository.

Using this mechanism, storage of metadata may be improved. An indication to commit may be sent from the indexing client (and subsequently received by the metadata store client) based on events related to obtaining the indexing updates. For example, an indication to commit may be sent (and subsequently received) once a particular amount of time has passed. As a result, the amount of indexing updates lost in the event of a failure (e.g. the amount of time between commits) may be controlled. Further, groups of indexing updates may be batched together and a request to commit the batch to the metadata store together may be sent to the metadata store. This results in fewer updates to the metadata store and faster, more efficient writing of the metadata. For example, because it may be inefficient to commit each small indexing update individually (e.g. due to the overhead of performing each commit) the indexing updates may be held and not committed until it is advantageous. For example, in some cases, none of the indexing updates in a batch are committed until an indication to perform the commit of the batch is received at the metadata store. In some cases, if convenient, some indexing updates may be committed before a complete batch has been received at the metadata store and before a request to commit is received at the metadata store. This can relieve memory pressure at the intermediate store and may take advantage of the benefits of committing a group of indexing updates to the metadata store together. This allows the metadata store to be updated at select opportune times when required or desired. Moreover, a write-ahead log need not be used and each indexing update need not be written to long term storage (e.g. buckets) multiple times. Instead, the indexing update is only permanently written to the metadata store when committed.

In some embodiments, the metadata store stores data in buckets (e.g., logical data structures). In such embodiments, the indexing updates for data items in a particular directory may be written to a particular bucket. Thus, all indexing updates for the data items of the same directory are stored in the same bucket. In some embodiments, indexing updates are each associated with a respective key, with the keys configured such that the indexing updates for all data items in a directory are stored in the same bucket. In some embodiments, the key is based on the filename path for the data item corresponding to the indexing update. Use of buckets in the metadata store may improve the scalability of the metadata store. For example, in a distributed storage system including multiple storage nodes, each node may include a number of buckets. Buckets may be added or removed when corresponding storage nodes are added or removed. Thus, such a metadata store may be more readily scaled up by adding more nodes. In addition, storing all indexing updates for data items in a directory in the same bucket may improve storage and use of the metadata. Because all indexing updates for items in the same directory may be batched together (as discussed above) and subsequently stored in the same bucket together, write efficiency is improved. Further, distributed storage of metadata in different storage nodes allows for improved resilience of the system against failures. Accessing the metadata may also be improved. If the indexing updates are stored based on a key including the filename path, the contents of the directory may be more readily searched and browsed using the filename path of the desired item. Further, the listing of metadata based on the key may be provided in alphabetical order based on the filename path. Consequently, storage and use of the metadata may be improved. Moreover, each bucket may be further divided, for example into a search index store and a version information store. The search index store may be used to store portions of the indexing update, such as the file name, that generally do not change. The version information store may be used to store information that may change for different backups, such as the version of the data item.

In some embodiments, the metadata store client sends groups of indexing updates for storage in the intermediate store and associates the indexing updates with a session identifier; in this case, the request to commit the indexing updates which is sent from the metadata store client to the metadata store manager can include the session identifier and be used in communication between the metadata store client and metadata store manager. In such embodiments, the request from the metadata store client to the metadata store manager to commit the batch to the metadata store is based on the session identifier. In some instances, a reply from the metadata store manager indicating that the session identifier is invalid may be received by the metadata store client. The session identifier may be invalid because of failure of a component, such as the metadata store manager, used in committing the indexing updates. In response to the reply, an indication that the commit is not completed is provided from the metadata store client to an indexing client. The indexing client is the component that performs the indexing process. The indexing updates that have failed to commit may be obtained again using the indexing process and received again by the metadata store client. These indexing updates are again sent, in some embodiments as groups, to the metadata store manager for storage in the intermediate store. A new indication to commit these indexing updates from the indexing client is also received at the metadata store client. In response, remaining indexing updates may again be sent from the metadata store client to the metadata store manager for storage at the intermediate store. The metadata store client may also send a request to commit to the metadata store manager. The indexing updates sent from the metadata store manager to the intermediate store may be associated with a new batch based on a new session identifier. The metadata store manager may attempt to commit the new batch associated with the new session identifier. Thus, use of the session identifier may allow for recovery from failures in committing of the indexing updates. Consequently, reliability may be improved. In some embodiments, replication of at least a portion of the indexing updates to multiple locations of the metadata store is requested by the metadata store manager. For example, the batch may be requested to be committed to one bucket on a first node for use and replicated to another bucket on a second node to protect against failures of the first node. Consequently, fault tolerance may be improved while preserving efficiency of storing metadata. For embodiments which may commit some indexing updates at the metadata store before a request to commit those indexing updates is received, a failed commit may result in the situation where some indexing updates in a batch have been committed while others have not. However, the indexing client may produce indexing updates by indexing the metadata of a backup stored in a secondary system's data repository. A failure in committing indexing updates may result in the indexing client re-indexing at least part of the same metadata of the same backup as were indexed for the failed commit. This re-indexing may produce indexing updates which will produce the same changes to the metadata store as the indexing updates of the failed commit. Accordingly, as a result of a failure to commit a batch, the same indexing update may be committed twice for embodiments which allow indexing updates to be committed to the metadata store before receiving a request to commit.

Figure 1B:
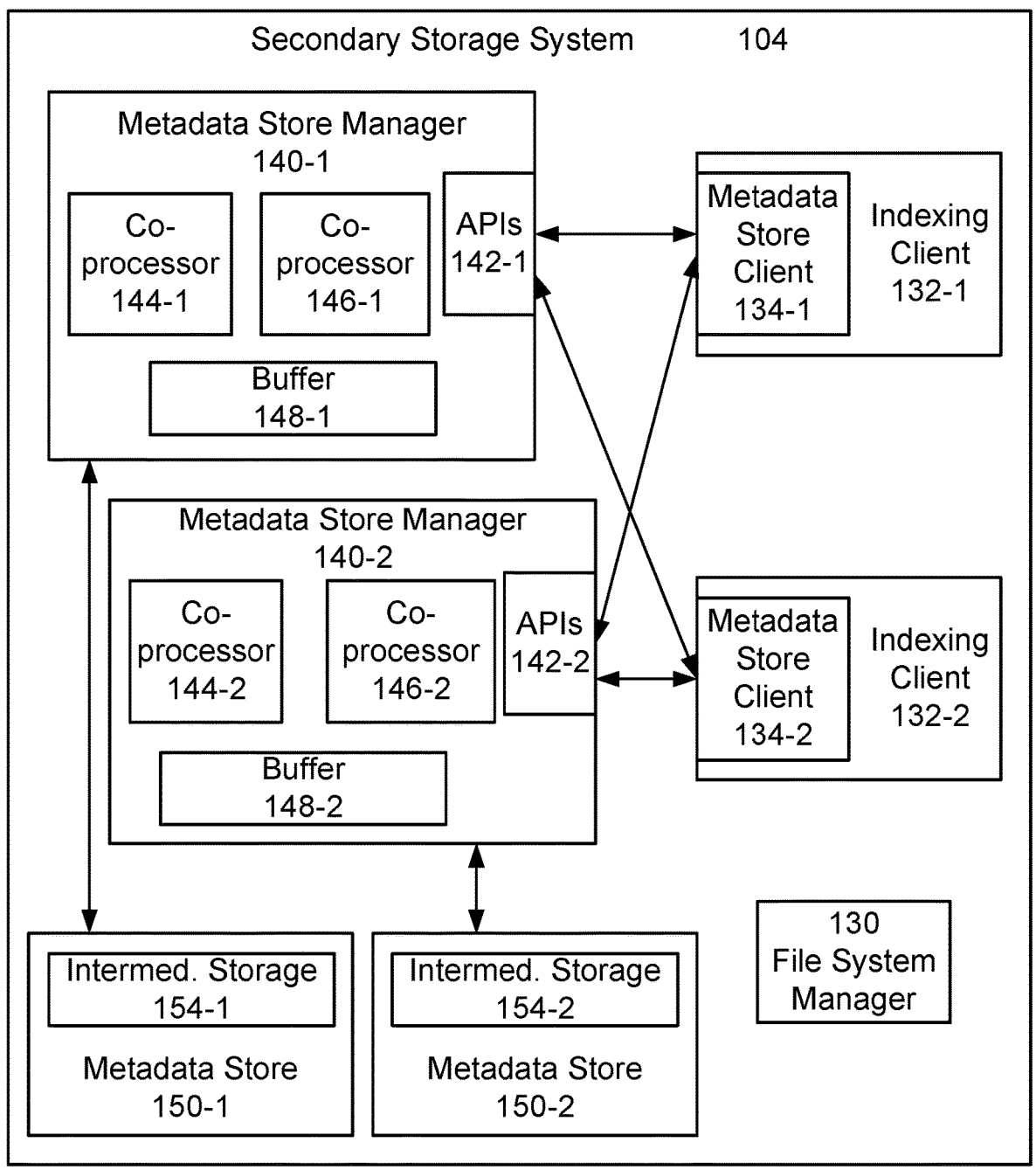
Figure 1C:
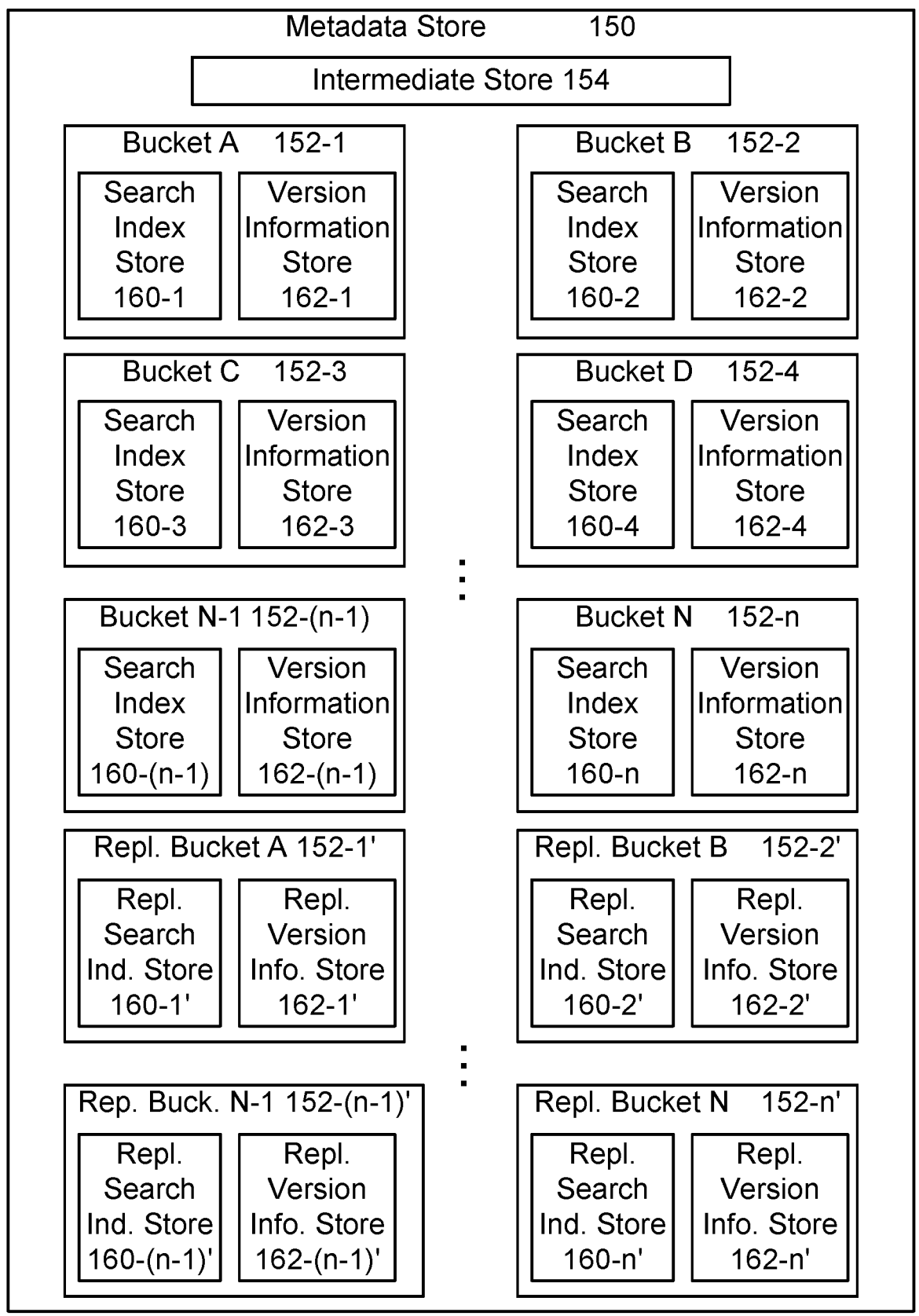

FIGS. 1A-1C are diagrams depicting an exemplary embodiment of a distributed storage system 100. System 100 includes a primary storage system 102, secondary storage system 104, and cloud storage 101. Primary storage system 102 is a computing system that stores data items and file system data. Primary storage system 102 may be comprised of one or more servers, one or more computing devices, one or more storage devices such as NAS devices, VMs, databases, and/or a combination thereof. Primary storage system 102 may be coupled to other client devices (not shown), for example via a network.

Primary storage system 102 is configured to back up data to secondary storage system 104. Secondary storage system 104 may thus be coupled with the primary storage system 102 through a network 103 and network interface 109. Network connection 103 may be a wired or wireless connection. Backup agent 106 orchestrates a backup of primary storage system 102 based on backup policies. In order to perform a backup, a snapshot may be captured of some or all of primary storage system 102. The snapshot stores the state of some or all of primary storage system 102 at the time of capture. For example, a snapshot may be for a full or incremental backup.

Secondary storage system 104 may receive and store the backup. In some embodiments, secondary storage system 104 is configured to store the backup data in a tree data structure. The tree data structure may include one or more snapshot trees. The snapshot tree provides a view of the file system data corresponding to a backup snapshot. A snapshot tree may include a root node, one or more levels of one or more intermediate nodes associated with the root node, and one or more leaf nodes associated with an intermediate node of the lowest intermediate level. The tree data structure allows a chain of snapshot trees corresponding to different backup versions of backup snapshots (i.e., different snapshot tree versions) to be linked together by allowing a node of a later version of a snapshot tree to reference a node of a previous version of a snapshot tree. A snapshot of the tree data structure may be associated with a view of the tree data structure at a particular moment in time.

Secondary storage system 104 may store snapshots across cluster 108 and/or archive the snapshots to cloud storage system 101. Cloud storage system 101 may be a public cloud storage provider. Cloud storage system 101 is configured to receive and store an archive from secondary storage system 104.

Storage cluster 108 includes a plurality of storage nodes $N_1$ through $N_n$. In some embodiments, storage cluster 108 may provide secondary storage services, primary storage services, or both. For example, storage cluster 108 may be a part of a secondary storage system such as secondary storage system 104 for one or more primary systems such as primary system 102. In such embodiments, storage cluster 108 is configured to back up a plurality of files stored on primary storage system 102. In some embodiments, storage cluster 108 is configured to store a plurality of files generated by an entity (e.g., a user, a system, or an application) associated with storage cluster 108. In such embodiments, storage cluster 108 may provide primary storage services. In some embodiments, storage cluster 108 may initially be part of a secondary storage system, but be promoted to a role as a primary storage system for some or all resources (e.g., files) available to storage cluster 108. Further, although described in the context of a hardware cluster, storage cluster 108 may be implemented in another manner including but not limited to a virtual cluster in the cloud.

For simplicity, only storage nodes $N_1$ 110 and $N_n$ 120 are labeled and shown. Each storage node 110 through 120 of secondary storage system 104 may be comprised of one or more processors 112 and 122 and accompanying storage elements 114, 116, and 118, and 124, 126, and 128, respectively. Storage elements 114, 116, 118, 124, 126, and/or 128 may be solid state drives, one or more hard disk drives, or a combination thereof. Secondary storage system 104 may also include one or more processors coupled to the storage drives and configured to archive data stored in the storage drives to cloud storage system 101, an additional cluster (not shown), and/or one or more other storage mediums (e.g., tape, removable storage, etc.). Although a particular number of storage elements 114, 116, 118, 124, 126, and/or 128 are shown, another number may be used. Further, storage elements 114, 116, 118, 124, 126 and 128 may be heterogeneous, utilizing different types of storage mediums. Thus, storage cluster 108 may include a metadata store and/or a data repository that stores data items that are backed up, for example via a snapshot, and metadata for the data items.

Secondary storage system 104 may also include file system manager 130, indexing clients 132-1 and 132-2 (collectively or generically indexing client 132), metadata store clients 134-1 and 134-2 (collectively or generically metadata store client 134), metadata store managers 140-1 and 140-2 (collectively or generically metadata store manager 140) and metadata store 150-1 and 150-2 (collectively or generically metadata store 150), as shown in FIG. 1B. Metadata store managers 140-1 and 140-2 may include buffers 148-1 and 148-2 (collectively or generically buffer 148) that may temporarily store data. Metadata store 150-1 and 150-2 may include intermediate store 154-1 and 154-2 (collectively or generically intermediate store 154). Intermediate store 154 may be used by metadata store 150 to temporarily store data and may be buffer(s). Although shown as part of particular components, buffers 148 and intermediate stores 154 may be configured in another manner. For example, buffer 148 and intermediate store 154 may be combined into a single component and made part of metadata store 150 or part of metadata store manager 140 or may be implemented separate from metadata store 150 and/or metadata store manager 140. File system manager 130 is configured to maintain file system data in the form of nodes arranged in the tree data structure described above. Structures 130, 132, 134, 140, 154 and 150 may be distributed across storage nodes 110 through 120. Although two indexing clients 132-1 and 132-2 including two metadata store clients 134-1 and 134-2 are shown, another number may be present. Further, in some embodiments, indexing client 132 and metadata store client 134 may be writing to and reading from a shared memory (not shown in FIG. 1B).

Indexing clients 132 perform an indexing process that obtains metadata and/or updates to metadata for data items that have been backed up. The metadata updates performed by an indexing client may be based on a data item type. For example, indexing client 132-1 might perform an indexing process for data items such as files, while indexing client 132-2 may perform an indexing process for data items such as emails. Metadata for a data item may include the name of the data item, size of the data item, last modification of the data item, version information, corresponding snapshot (i.e., backup) and/or other information related to the data item, and the snapshot to which the data item corresponds. Updates to the metadata include any changes to metadata previously obtained for the data item. The indexing process provides indexing updates which may include new metadata, updates to the metadata, or both.

To perform the indexing process, indexing clients 132 may traverse the tree data structure used to back up primary storage system 102 and obtain indexing updates for the data items. For example, indexing clients 132 may perform a depth-first-search traversal of the tree data structure for a snapshot. In some cases, the obtained indexing updates include only changes to the metadata for the data item since the last backup. In other cases, obtaining the indexing updates includes collecting all metadata for the data items, regardless of whether the data item has changed since the last backup. In some embodiments, indexing client 132 generates an index for each of the indexing updates and associates the index with the corresponding indexing update. The index may be an identifier (e.g., a unique name, a locally unique identifier, a globally unique identifier) for an indexing update. For example, the index may be a message ID of an email corresponding to the indexing update, a filename of the data item corresponding to the indexing update, or the filename path of the data item corresponding to the indexing update. In some embodiments, the index may be used in generating a key (described below). Indexing client 132 requests writes, reads, and/or other operations on the metadata via metadata store client 134.

Metadata store clients 134 are included in and communicate with indexing clients 132. Metadata store clients 134 also communicate with metadata store managers 140 and may perform other functions. In some embodiments, metadata store clients 134 generate keys used in storing the indexing updates and determine where the indexing updates are stored in metadata store 150. For example, the keys may be used to divide storage of indexing updates into different buckets 152 of metadata store 150. A key may be generated based on the index for the indexing update, based on information in the indexing update, or in another manner. In some embodiments, metadata store clients 134 generate the key based on the filename path of the data item. In addition, metadata store clients 134 send groups which may comprise a plurality of indexing updates to metadata store managers 140 for processing and storage in intermediate store 154. Thus, metadata store client 134 receives indexing updates from indexing clients 132 and sends groups of these indexing updates on to a corresponding metadata store manager 140. Metadata store manager 140 may temporarily store the indexing updates in buffer 148 and may perform some processing on the indexing updates. Metadata store manager 140 also passes the processed indexing updates in the group to metadata store 150. Metadata store 150 temporarily stores these indexing updates in intermediate store 154 and then commits the indexing updates for permanent storage.

After receiving an indication to commit from the corresponding indexing client 132, metadata store client 134 requests that a metadata store manager 140 commit the indexing updates to metadata store 150. In response to the indication to commit, metadata store client 134 may also send any remaining unsent indexing updates to metadata store manager 140 for processing and storage in intermediate store 154. As part of the commit, indexing updates are batched and committed to the corresponding metadata store 150. In such embodiments, the metadata store manager 140 may request metadata store 150 to commit indexing updates in intermediate store 154. Metadata store clients 134 may communicate with metadata store managers 140 based on session identifiers. In some embodiments, metadata store clients 134 may communicate with metadata store managers using the same session identifier. For example, metadata store client 134-1 and metadata store client 134-2 may both communicate with metadata store manager 140-1 using a first session identifier. Metadata store client 134-1 and metadata store client 134-2 may both communicate with metadata store manager 140-2 using a second session identifier. Metadata store client 134-1 and metadata store client 134-2 may send indexing updates, independently and in parallel, to metadata store manager 140-1. Metadata store client 134-1 and metadata store client 134-2 may send indexing updates, independently and in parallel, to metadata store manager 140-2.

Metadata store 150 may be a key-value store. In other embodiments, metadata store 150 may be implemented in a different manner. In some embodiments, metadata store 150 includes buckets 152-1, 152-2, 152-3, 152-4 through buckets N−1 152-(n−1), and N 152-n (collectively buckets 152). For example, buckets 152 are logical data storage containers that can be used to organize stored data. Buckets 152 may reside across storage nodes 110 through 120. For example, bucket A 152-1 and bucket C 152-3 may reside on storage node 110, while bucket B 152-2 and bucket D 152-4 may reside on storage node 120. In some embodiments, replicas of buckets 152 may be present on different storage nodes. Buckets 152-1, 152-2, 152-3, 152-4 through buckets N−1 152-(n−1), and N 152-n may be stored in metadata store 150-1.

FIG. 1C depicts an embodiment of metadata store 150 including replica buckets 152-1', 152-2', through 152-(n−1)' and 152-n' (collectively replica buckets 152') that correspond to buckets 152-1, 152-2 through 152-(n−1) and 152-n, respectively. For example, bucket A 152-1 may reside on storage node 110, while a replica of bucket A 152-1' may reside on storage node 120. Replica buckets 152-1' through 152-n' are analogous to buckets 152-1 through 152-n, respectively. Consequently, the term buckets 152 may include replica buckets 152'. As indicated above, buckets 152 may be key-value storage containers for metadata of data items. For each key-value entry of a bucket, its key identifies a specific data item and the associated value includes the metadata for the specific data item. For example, for data items such as files, the key may be based on the filename path of the data item, while the value includes the indexing update. The number of buckets 152 may scale with the number of storage nodes 110 through 120 in storage cluster 108. Thus, adding a storage node to cluster 108 can increase the number of buckets 152. Further, the keys may be automatically redistributed between buckets 152 of metadata store 150 if the number of buckets changes. Replica buckets 152-1', 152-2', through 152-(n−1)' and 152-n' may be stored in metadata store 150-2.

In addition, each bucket 152 may include logical data storage containers that can be used to organize stored data. In the embodiment shown in FIG. 1C, each bucket 152 includes a corresponding version information store and a search index store. For example, bucket A 152-1 includes search index store 160-1 and version information store 162-1, bucket B 152-2 includes search index store 160-2 and version information store 162-2. Search index store is collectively and generically referred to as search index store 160. Version information store is collectively and generically referred to as version information store 162. Search index store 160 is used to store portions of the indexing update that are less likely to or do not change based on the backup version, such as the name of a data item and creation time of the data item. Version information store may store the portions of the indexing update that is more likely to or may change over time, such as the last time the data item was modified and the version of the snapshot. Separation of the indexing updates into search index store 160 and version information store 162 may improve efficiency of writes because only information in version information store 162 may be updated. Searches of the metadata may also be improved because information such as the name of the data item may be present only in the search index store 160.

As discussed above, metadata store 150 may also include intermediate store 154 used for temporary storage of indexing updates. In some embodiments metadata store 150 may perform early commit(s), which are not in response to a commit request from metadata store manager 140 (and thus not in response to an indication to commit from indexing client 132). For example, metadata store 150 may commit a subset of the indexing updates of a batch which are temporarily stored in intermediate store based on available resources, a particular threshold of intermediate store 154 being occupied by stored indexing updates and/or other criteria. In such embodiments, different subsets of a batch's indexing updates provided by metadata store manager 140 may be stored in intermediate store 154 and subsequently committed early by metadata store based upon the criteria mentioned above. Metadata store 150 may also perform a commit based upon a request to commit from metadata store manager 140. This request may be provided from metadata store manager 140 based upon a request to commit from metadata store client 134, which is in response to an indication to commit from indexing client 132. In this case, metadata store 150 commits any remaining indexing updates in intermediate store 154. In this case, the batch includes all indexing updates provided from indexing client 132 after the previous indication to commit from indexing client 132 and before the current indication to commit from indexing client 132. Prior to this request to commit the batch, any indexing updates of the batch that have undergone an early commit may be considered lost if there is a failure, for example of the metadata store manager 140 before all of the indexing updates of the batch are successfully committed.

Metadata store managers 140 may be distributed across multiple storage nodes 110 through 120 of storage cluster 108. Although two instances of metadata store managers 140 are shown, in another embodiment, another number may be present. In some embodiments, each of the metadata store managers 140 corresponds to a different storage node. In the embodiment shown, each metadata store manager 140-1 and 140-2 corresponds to a different metadata store 150-1 and 150-2, respectively. However, other configurations are possible. Metadata store managers 140 control storage of metadata in intermediate store 154 and metadata store 150. Metadata store manager 140-1 includes co-processors 144-1 and 146-1. Similarly, metadata store manager 140-2 includes co-processors 144-2 and 146-2. Co-processors 144-1 and 144-2 are collectively referred to as co-processors 144. Co-processors 146-1 and 146-2 are collectively referred to as co-processors 146. Co-processors 144 and 146 are each application specific software modules that may be embedded in metadata store managers 140 and can be invoked to perform specified processing to efficiently store and/or access metadata. This allows processing logic to be embedded with metadata store managers 140. Thus, co-processors 144 and 146 may each be configured to be automatically invoked to handle processing for specific tasks. For example, a read-modify-write operation or other changes to existing metadata may be performed using specific efficient handling code of co-processors 144 and/or 146. Co-processors 144 and 146 may thus allow for efficient updates of metadata by metadata store managers 140. Co-processors 144 and 146 may also be dedicated to different types of data items. For example, co-processors 144 may be used for metadata for emails that have been backed up, while co-processors 146 may be used for metadata for files. Other co-processors (not shown) that may have other and/or additional functions may be used in some embodiments. In addition, metadata store managers 140 include application programming interfaces (APIs) 142-1 and 142-2 (collectively APIs 142) that allow read, write, and text searching of the metadata to be performed.

Use of metadata store clients 134, metadata store managers 140, and metadata store 150 may improve performance of system 100. Metadata store client 134 allows indexing clients 132 to indicate when indexing updates are to be committed to metadata store 150. Thus, clients 132 may select a commitment time that complements the indexing process, such as after the expiration of a particular time interval or upon completion of the indexing process for all data items in a particular directory. Metadata store client 134 receives indexing updates from indexing client 132 and sends groups of the indexing updates to metadata store managers 140 for storage, for example in an intermediate store 154. Metadata store managers 140 may perform processing on the indexing updates in the groups and may store the received indexing updates in buffers 148 before, during, and/or after processing. Metadata store managers 140 provide the indexing updates to metadata stores 150, which temporarily store the (processed) indexing updates in intermediate store 154. As discussed above, metadata store 150 may perform an early commit of indexing updates in intermediate store 154.

Upon receiving an indication to commit from the corresponding indexing client 132, metadata store client 134 requests that metadata store managers 140 commit all of the indexing updates that have been sent and are not committed (e.g. are stored in intermediate store 154). In some embodiments, metadata store client 134 also sends any remaining indexing updates to metadata store managers 140 for storage in intermediate store 154 before requesting that metadata store managers 140 perform the commit. In such embodiments, all indexing updates since the previous commit (e.g. all indexing updates stored in intermediate storage 154) may be batched together such that large groups of indexing updates may be processed (e.g., committed to metadata store 150) without additional input from metadata store client 134. Thus, all indexing updates since the last indication to commit may be committed together. In some embodiments, some or all of the indexing updates in intermediate store 154 may be committed early to metadata store 150 without requiring the request to commit. This early commitment of some indexing updates may be used to ensure that intermediate store 154 does not overflow. For example, indexing updates stored in intermediate store 154 may be committed in response to a particular time interval expiring or a particular fraction of intermediate store 154 being full. In such embodiments, metadata store manager 140 may request a commit of some or all of the indexing updates currently stored in intermediate store 154 to the corresponding metadata store 150. A batch of indexing updates is viewed as committed when all of the updates in the batch of indexing updates have been committed. As a result, the benefits described herein may be achieved without requiring that intermediate store 154 always be large enough to hold all indexing updates in a batch.

Metadata store client 134 may also shard (horizontally divide storage of) indexing updates in metadata store 150. For example, metadata store client 134 may shard indexing updates such that indexing updates for data items stored in the same directory are stored in the same bucket 152 of metadata store 150. Batching of commits for indexing updates allows for improved efficiency in updating metadata store 150. The use of buckets improves scalability and allows metadata store client 134 to shard indexing updates such that all indexing updates for data items in the same directory are stored to the same bucket. This improves write efficiency. Use of the key incorporating the filename path allows for improved read and browsing of metadata. In addition, buckets may include logical containers for indexing updates unlikely to change (search index store 160) and for indexing updates that are more likely to change (version information store 162). Thus, storage of indexing updates is also made more efficient. Metadata store client 134 and metadata store managers 140 also protect against failures in system 100 by communicating via sessions and batching the indexing updates based upon the sessions. Thus, efficiency and reliability of system 100 may be improved.

Figure 2:
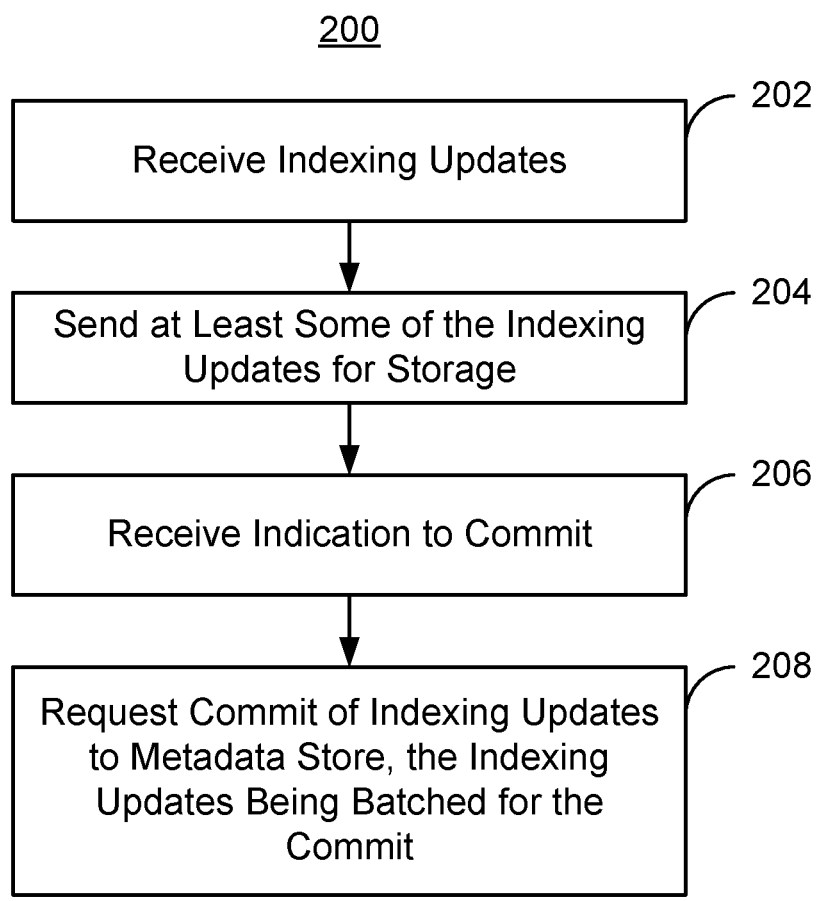
FIG. 2 depicts an exemplary embodiment of a method for storing metadata.

FIG. 2 depicts an exemplary embodiment of method 200 for storing metadata. For clarity only some steps may be shown. Further, the steps may be performed in another order and/or include substeps. Method 200 is also described in the context of system 100 depicted in FIGS. 1A-1B. However, in other embodiments, method 200 may be used in conjunction with another storage system (not shown).

A plurality of different indexing updates of a data repository is received, at 202. The indexing updates may be obtained by an indexing process, provided by an indexing client, and received by a metadata store manager. The data repository (e.g., cluster 108) may be associated with a secondary storage system (e.g., secondary storage system 104), which is configured to perform a backup of a primary storage system (e.g., primary system 102). In other embodiments, the data repository may be associated with primary storage. As discussed above, an indexing update includes metadata and/or an update to the metadata for a data item that is obtained as part of an indexing process. Different indexing updates include indexing updates for different data items. Thus, metadata and/or updates to metadata for data items backed up on secondary storage system 104 are received at 202. Also at 202, an index associated with and identifying each indexing update may be received for each indexing update.

At least some of the indexing updates are sent for storage at intermediate stores, at 204. In some embodiments, groups of indexing updates are sent at 204 from a metadata store client to a metadata store manager and temporarily stored in an intermediate store. In some embodiments, the metadata store client receives indexing updates from an indexing client and sends groups of the indexing updates to the metadata store manager. Alternatively, the indexing client can be viewed as using the resources in metadata store client to send groups of indexing updates to the metadata store manager. 202 and 204 may be iteratively performed. Indexing updates are sent out in groups. Sending the indexing updates for storage at 204 may include generating a key for each indexing update and sharding the indexing updates for storage in different locations. In other embodiments, key generation and other activities such as sharding may be separate from sending the groups of indexing updates. In some embodiments, sending of the groups of indexing updates at 204 is associated with a session identifier for communication between the metadata store manager and the metadata store client.

An indication to commit is received, at 206. The indication to commit may be provided by the indexing client and received by the metadata store client. In some embodiments, the indication to commit includes a request to commit the indexing updates (e.g., perform a checkpoint action to save content of indexing updates to the metadata store). In some embodiments, the indication to perform a commit may be a notification that a particular event has occurred and/or the state of the indexing process has been saved. For example, the indication to commit may be a notification that indexing updates for all items in a directory have been obtained or a particular time interval has expired.

In response to the indication to perform the commit, a request to commit the indexing updates is provided, at 208. The metadata store client may provide the request to commit to the metadata store manager at 208. In some embodiments, any remaining indexing updates received from the indexing client are also sent by the metadata store client to the metadata store manager for storage in an intermediate store. The request to commit requests that all indexing updates since a previous indication to commit, including those sent in response to the most recent indication to commit, are committed. The indexing updates are also batched together for the commit. Batching associates multiple indexing updates together. All indexing updates in a batch must be successfully committed in order for the batch to be considered successfully committed. The request to commit a batch of indexing updates will fail if any indexing update in the batch fails. Because the batch is requested to be committed, the indexing updates in the batch are considered to be successfully committed only if the entire batch is committed. In some instances, all of the indexing updates received by the metadata store manager since the last commit are part of the batch and are committed together. In other instances, some of the indexing updates received by the metadata store manager since the last commit have already been committed (i.e. are committed early as described above). Thus, only a remaining portion of the indexing updates since the last commit are committed in response to the indication to commit. In some embodiments, indexing updates which underwent early commits and indexing updates committed in response to the indication to commit from the indexing clients can be part of the same batch. In such embodiments, failure of a commit of any of the indexing updates in this batch results in the failure to commit of all indexing updates in the batch. In the event of a failure, indexing client re-indexes all of the indexing updates in the batch. The commit of the batch may also be requested in association with a session identifier for communication between the metadata store manager and the metadata store client.

For example, suppose indexing client 132-1 performs an indexing process for the data items in a backup. Indexing client 132-1 traverses the tree data structure and obtains the indexing updates for data items in each directory of the tree data structure. These indexing updates may include new metadata for data items not previously backed up, may include changes to existing metadata for data items previously backed up, and/or may otherwise create and/or modify the metadata for the data items. In some embodiments, indexing client 132-1 traverses the directories such that the indexing updates for all data items in a directory are obtained before indexing client 132-1 starts operations on the next directory. Indexing client 132-1 may also associate each indexing update with an index. Indexing client 132-1 provides these indexing updates to metadata store client 134-1. Metadata store client 134-1 receives these indexing updates from indexing client 132-1 at 202 and sends groups of the indexing updates to metadata store manager(s) 140 at 204. Metadata store manager(s) 140 may store the indexing updates in buffer(s) 148 before, during, and/or after additional processing of the indexing updates. The processed indexing updates are sent to metadata store 150 and temporarily stored in intermediate store 154. As discussed above, in some cases, metadata store 150 may perform early commits of indexing updates stored in intermediate store 154.

Indexing client 132-1 provides an indication to perform a commit, which is received by metadata store client 134-1, at 206. The indication to commit may be a request to commit the indexing updates received at 202 or may be a notification that a particular interval has expired or a particular action has been completed (e.g. saving the state of the indexing process).

In response to the indication to perform the commit, metadata store client 134-1 may send any remaining indexing updates to metadata store managers 140 and requests that the indexing updates be committed to metadata store 150. Metadata store managers 140 perform any additional processing and store the indexing updates in intermediate store 154 of metadata store 150. The indexing updates are batched so that any remaining indexing updates of the batch may be committed without further intervention from metadata store client 134-1. Batching updates means that all indexing updates in the batch must be committed in order for the batch to be considered committed. Thus, the indexing updates received at intermediate store 154, whether committed early or committed in response to the indication to commit from indexing client 134, can be part of the same batch in some embodiments. In some embodiments, any remaining indexing updates in intermediate store 154 of metadata store 150 are committed.

Separately or as part of 204 and/or 208, metadata store client 134-1 may also generate a key and shard the indexing updates for storage in separate locations based upon the key. As part of 204 or 208, metadata store client 134-1 may provide the groups of indexing updates and associated keys to metadata store managers 140 and request that the indexing updates be committed to metadata stores 150 based on the keys. Metadata store managers 140 store the indexing updates and commit the indexing updates to metadata store 150 based on the information provided by metadata store client 134-1. For example, the indexing updates may be stored in buckets 152 and replicated in buckets 152' based upon the key. As a result, indexing updates for data items in the same directory may be stored in the same bucket of metadata store 150. In addition, the key or other mechanism may be used to separate portions the indexing updates into containers 160 and 162 based upon whether the portion of the indexing update is unlikely to or does not change with versions of the data item (container 160) or whether the portion of the indexing update is likely to or does change with version of the data item (container 162). Thus, storage of indexing updates may be further facilitated.

Using method 200, storage and use of metadata may be improved. Because indexing clients 132 determine when indexing updates are committed, indexing clients 132 may select an efficient time for commitment of the indexing updates. For example, the indication to commit may occur after the expiration of a time interval set so that the amount of data lost in the event of a failure may be managed. Similarly, the request to commit may occur after the indexing process has completed for all data items in a particular directory. Batching together of the indexing updates may make committing to metadata storage 150 more efficient. In the example above, portions of the indexing updates may be grouped and sent for storage in intermediate store 154. Thus, an indexing client or metadata store client need not store all of the indexing updates to be committed. Further, sending the indexing updates in groups reduces overhead. The metadata store 150 may perform early commits of some or all of the indexing updates sent to intermediate storage, which may protect against overflows of intermediate store 154. Some or all of the indexing updates since a previous commit request may be committed to the metadata store in a batch. As a result, if any indexing updates in the batch fails, the indexing client may re-index all of the indexing updates in the batch. Thus, storage of indexing updates may be made faster, more efficient and more reliable, even if storage elements 114, 116, 118, through 124, 126, and 128 are hard disk drives. Use of buckets 152 in the metadata store may improve the scalability of method 200 and system 100. For example, additional buckets may simply be added/removed when corresponding storage nodes are added/removed. Thus, secondary storage system 104 may be more readily scaled up. Further, distributed storage of metadata allows for improved resilience of the system 100 and method 200 against failures. Storage of metadata based upon keys configured such that metadata for data items in a particular directory are stored in the same bucket also may improve write efficiency, read efficiency, and browsing of metadata. For example, using the key, all of the indexing updates for data items in the directory may be committed together to the same bucket. Because the indexing updates may be stored based on the filename path, the contents of the directory may be more readily searched and browsed. For example, a low latency browse of the contents of the directory may be facilitated. Consequently, performance may be improved.

Figure 3A:
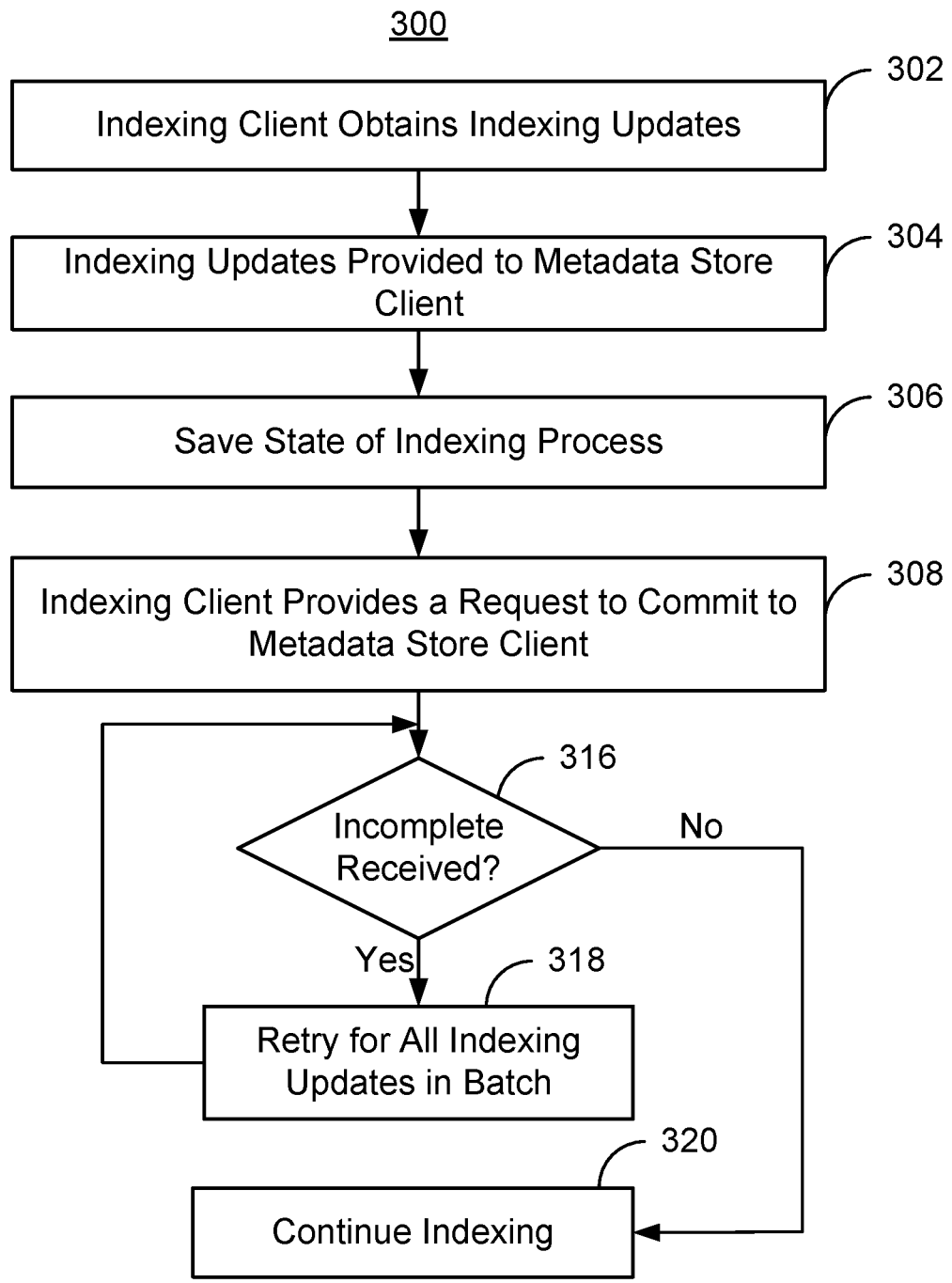
FIG. 3A depicts an exemplary embodiment of a portion of a method for indexing and storing metadata.
Figure 3B:
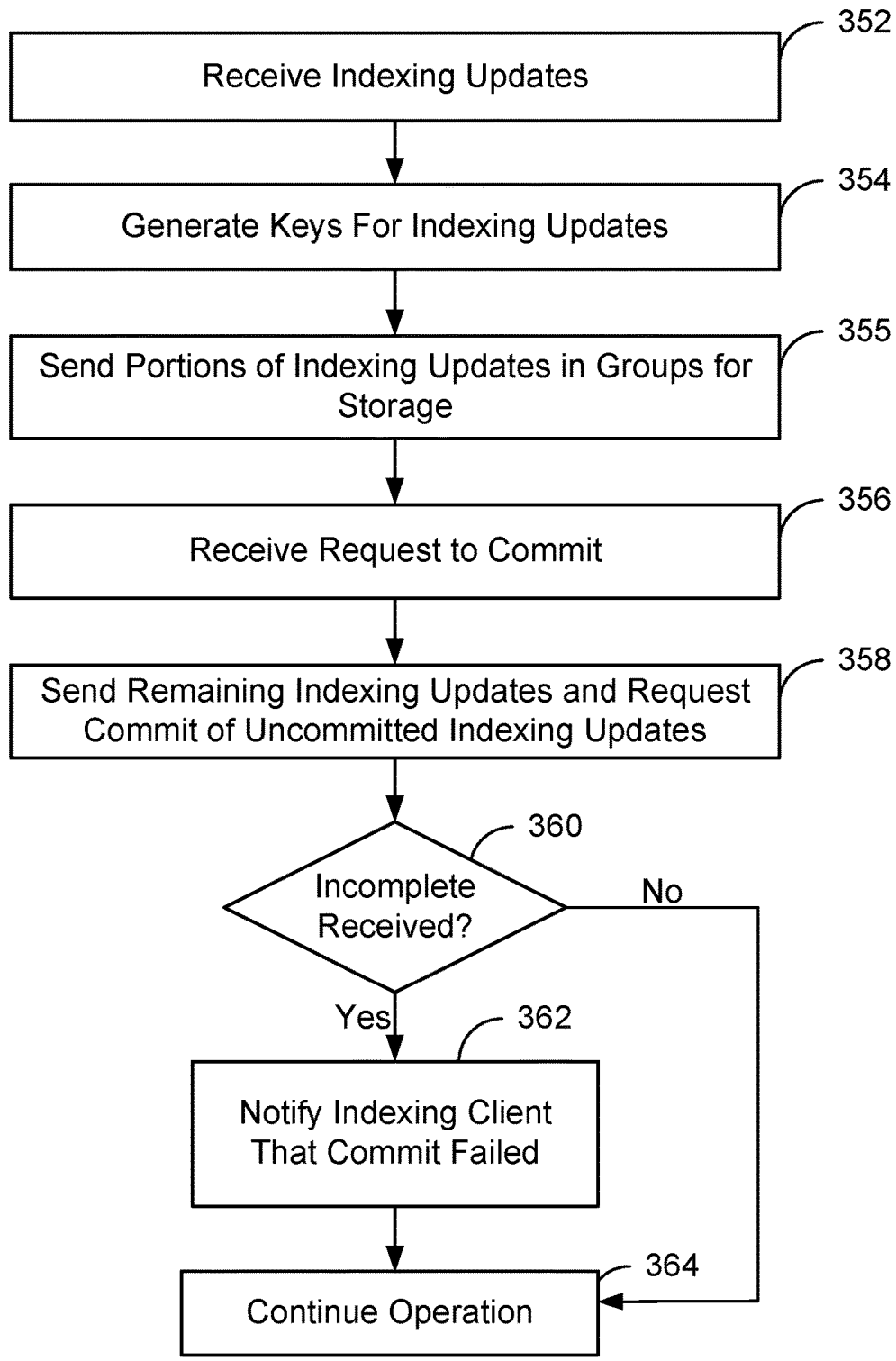
FIG. 3B depicts an exemplary embodiment of a portion of a method for indexing and storing metadata.

FIGS. 3A and 3B depict flowcharts of exemplary embodiments of methods 300 and 350 for storing metadata. FIG. 3A depicts an exemplary embodiment of method 300 for indexing data items and storing metadata from the perspective of an indexing client. For clarity only some steps may be shown. Further, the steps may be performed in another order and/or include substeps. Method 300 is also described in the context of system 100 and backups using snapshots. However, in other embodiments, method 300 may be used in conjunction with other systems and/or another backup mechanism. For simplicity, method 300 is described in the context of indexing client 132-2, metadata store client 134-2, metadata store manager 140-1, and metadata store 150. However, method 300 may be used with other components analogous to indexing client 132-2, metadata store client 134-2, metadata store manager 140-1, and metadata store 150.

Indexing client 132-2 performs an indexing process for the snapshot to obtain indexing updates for the data items in the snapshot, at 302. Thus, indexing client 132-2 collects metadata and/or changes thereto (i.e., indexing updates) for the data items. Indexing client 132-2 may also provide an index for each indexing update and associate each indexing update with the index. The indexing updates are provided by indexing client 132-2 to the metadata store client 134-2, at 304.

Indexing client 132-2 saves the status of the indexing process, at 306. Thus, the portion of the snapshot for which indexing updates have been collected is saved. In some embodiments, 306 occurs after expiration of a particular time interval since the last time the status is saved. An indication to commit the indexing updates is provided by indexing client 132-2 to metadata store client 134-2, at 308. The indication to commit provided at 308 may be a request to commit or may take another form such as a notification that the particular time interval has expired or that the status has been saved. In some embodiments, indexing client 132-2 then continues the indexing process.

It is determined whether indexing client 132-2 has received a notification that the commit is incomplete, at 316. If the commit is successful, (no notification of a failure to commit is received), and the indexing process continues at 320. If commitment of the indexing updates fails, metadata store client 134-2 provides a notification to indexing client 132-2. In this case, it is determined at 316 that the incomplete notification has been received. Indexing client 132-2 retries the indexing process for all indexing updates in the batch (which were requested to be committed), at 318. Stated differently, indexing client 132-2 repeats 302, 304, 306, and 308 for the batch of indexing updates that has just failed to be committed. In some embodiments, this includes repeating the indexing process from the previously saved state to the state saved at 306. Thus, indexing client 132-2 repeats the indexing process for the indexing updates in the batch to obtain the indexing updates at 302, again provides the indexing updates to metadata store client 134-2 as in 304, re-saves the state in 306, and again requests the commit as in 308. This is repeated until the commit of the indexing updates is successful. Method 300 may be repeated until all metadata from the data items in the tree data structure being traversed by indexing client 132-2 has been collected and successfully stored.

FIG. 3B depicts an exemplary embodiment of method 350 for indexing data items and storing metadata from the perspective of a metadata store client communicating with the indexing client. For clarity only some steps may be shown. Further, the steps may be performed in another order and/or include substeps. Method 350 is also described in the context of system 100 and backups using snapshots. However, in other embodiments, method 350 may be used in conjunction with another storage system (not shown) and/or another backup mechanism. For simplicity, method 350 is described in the context of indexing client 132-2, metadata store client 134-2, metadata store manager 140, and metadata store 150. However, method 350 may be used with other components analogous to indexing client 132-2, metadata store client 134-2, metadata store manager 140, and metadata store 150.

The indexing updates provided by indexing client 132-2 are received by metadata storage client 134-2, at 352. Thus, metadata store client 134-2 receives new metadata and changes to previously stored metadata.

Metadata store client 134-2 generates keys for the indexing updates, at 354. In some embodiments, metadata store client 134-2 also shards the indexing updates based on the key at 354. Thus, the appropriate bucket(s) 152 for each indexing update may be determined based on the corresponding key. In some embodiments, the key may be based on the filename path or analogous information. Thus, 354 may include sharding the indexing updates based upon the filename path such that the indexing updates for data items in the same directory are assigned to the same bucket. Sharding may include assigning indexing updates sharing the same key (filename path) except for the name of the data item (e.g. sharing the same filename path up to the directory in which the data item resides) to the same bucket.

Portions of the indexing updates are sent in groups for storage in an intermediate store 154-2, at 355. At 354, metadata store client 134-2 sends the groups of updates to the corresponding metadata store manager(s) 140. In some embodiments, 352, 354 and 355 may be iteratively performed. Thus, indexing updates may be viewed as processed in a pipeline that receives, generates keys and sends groups of indexing updates and keys for intermediate storage.

Metadata store client 134-2 receives an indication to commit the indexing updates from the corresponding indexing client 132-2, at 356. In response, metadata store client 134-2 sends any remaining indexing updates received to metadata store manager(s) 140 for storage in intermediate store 154 and provides a request to metadata store manager(s) 140 that the indexing updates be committed, at 358. The indexing updates are batched together (associated with each other) into a batch. In some embodiments, the batch includes all indexing updates received since the last commit. In some embodiments, some of the indexing updates are committed early, for example to ensure that intermediate store 154 is not filled. In such embodiments, only some of the indexing updates (e.g. all indexing updates that are still in intermediate store 154) are committed in response to the request to commit. However, both indexing updates committed early and indexing updates committed in response to the request may be part of the same batch. The commit may associate certain indexing updates with particular buckets 152 of metadata store 150. This association may be made via the key generated at 354. The request may indicate that the indexing updates for data items in the same directory are to be stored in the same bucket. In some embodiments, portions of the indexing update may be committed to logical containers based on properties of the indexing updates. For example, portions of indexing updates having a low probability of being altered (e.g. data item name) may be stored in search index store 160, while portions of the indexing updates having a high probability of being altered (e.g. version, last modified time) may be stored in version information store 162. In other embodiments, the indexing updates may be organized in metadata store 150 in another manner.

If the commit request can be completed, metadata store manager 140 commits the remaining indexing updates of the batch (e.g. all indexing updates still in intermediate store 154) to buckets 152 of metadata store 150 based on the key. It is determined whether an indication that the commit was not completed is received by metadata store client 134-2, at 360. If it is determined that no incomplete commit notification is received at 360, operation continues at 364. If, however, the commit request cannot be completed (e.g. at least one update in the batch was not committed successfully) then an indication that the commit was not completed would be sent. It is determined at 360 that a notification that the commit was incomplete has been received. In such a case, metadata store manager 140 has notified metadata store client 134-2 that the commit of the batch of indexing updates has not been completed successfully. In response, metadata store client 134 notifies indexing client 132-2 that the commit has not been completed, at 362. Thus, indexing client 132-2 is informed that at least one of the indexing updates for data items from the previously stored state of the indexing process to the state stored at 306 of FIG. 3A have not been committed. Consequently, indexing client 132-2 retries indexing and commitment of indexing updates of the failed batch as discussed above. Method 350 may be repeated until all metadata from the data items in the tree data structure being traversed by indexing client 132-2 has been collected and stored.

For example, methods 300 and 350 may proceed as follows. Indexing client 132-2 provides indexing updates to metadata store client 134-2 at 304, which are received by metadata store client 134-2 at 352. Metadata store client 134 generates the keys at 354. In some embodiments, the key generated at 354 is based on the filename path. For example, the key may simply include a prefix based on an object identifier and the filename path. The object identifier may uniquely identify the object, such as a VM or NAS device, in which the data item resides. The filename path specifies the path of directories to the location at which the data item reside. For example, suppose there are three data items on an object such as a VM: data.xls, payroll.xls, and party.avi. In this example, data.xls and payroll.xls are from the same directory. In this example, //home/cohesity)/data/Documents/data.xls is the filename path for data.xls; //home/cohesity/data/Documents/payroll.xls is the filename path for payroll.xls; and //home/cohesity/data/Videos/party.avi is the filename path for party.avi. The corresponding keys generated at 354 may be:

<object_id1>//home/cohesity/data/Documents/data.xls→ for data.xls;
<object_id1>//home/cohesity/data/Documents/payroll.xls→ for payroll.xls; and
<object_id1>//home/cohesity/data/Videos/party.avi→ for party.avi.

The corresponding values are the indexing updates for data.xls, payroll.xls, and party.avi, respectively. Groups of indexing updates are also sent from metadata store client 134-2 to metadata store managers 140 for processing and stored in intermediate store 154 of metadata store 150, at 355. Metadata store 150 may perform early commit(s) for indexing updates store in intermediate store 154.

Indexing client 132-2 provides an indication to commit the indexing updates to metadata store client 134-2 at 308, which is received at 356. Metadata store client 134-2 sends the remaining indexing updates to metadata store manager(s) 140 and provides to metadata store manager(s) 140 a request to commit the batch (i.e. all indexing updates since a previous indication to commit, including those having undergone an early commit) at 358. If the commit request cannot be completed, metadata store client 134-2 is notified by metadata store manager 140. This notification is recognized at 360 and indexing client 132-2 is informed at 362. Indexing client 132-2 receives the notification of an incomplete commit from metadata store client 134-2 at 316 and the process described above is repeated at 318. If the commit can be completed, metadata store manager 140 stores the indexing updates to buckets 152 of metadata store 150 based on the key. In the example above, indexing updates for data.xls and payroll.xls are stored in a first bucket, such as bucket 152-1. In contrast, indexing updates for party.avi may be stored in a different bucket, such as bucket 152-2, because party.avi resides in a different directory. In addition, portions of the indexing updates may be stored in different logical containers 160 and 162 based upon the properties of the portions of the indexing updates.

Methods 300 and 350 may share the benefits of method 200. Using methods 300 and 350, storage of metadata may be improved. Because committing of the indexing updates is batched, writing the metadata may be more efficient. Determination of when to commit is performed by indexing client 132-2. Thus, storage of indexing updates may be made faster and more efficient. Use of buckets 152 in metadata store 150 may improve the scalability of methods 300 and 350 and system 100. Storage of metadata based upon the filename path and such that metadata for data items in a particular directory are stored in the same bucket may improve storage, searching, and reading of metadata. Similarly, storage of different portions of the metadata into different containers 160 and 162 within a bucket may also improve storage, searching and reading of metadata. Consequently, performance may be improved.

Figure 4A:
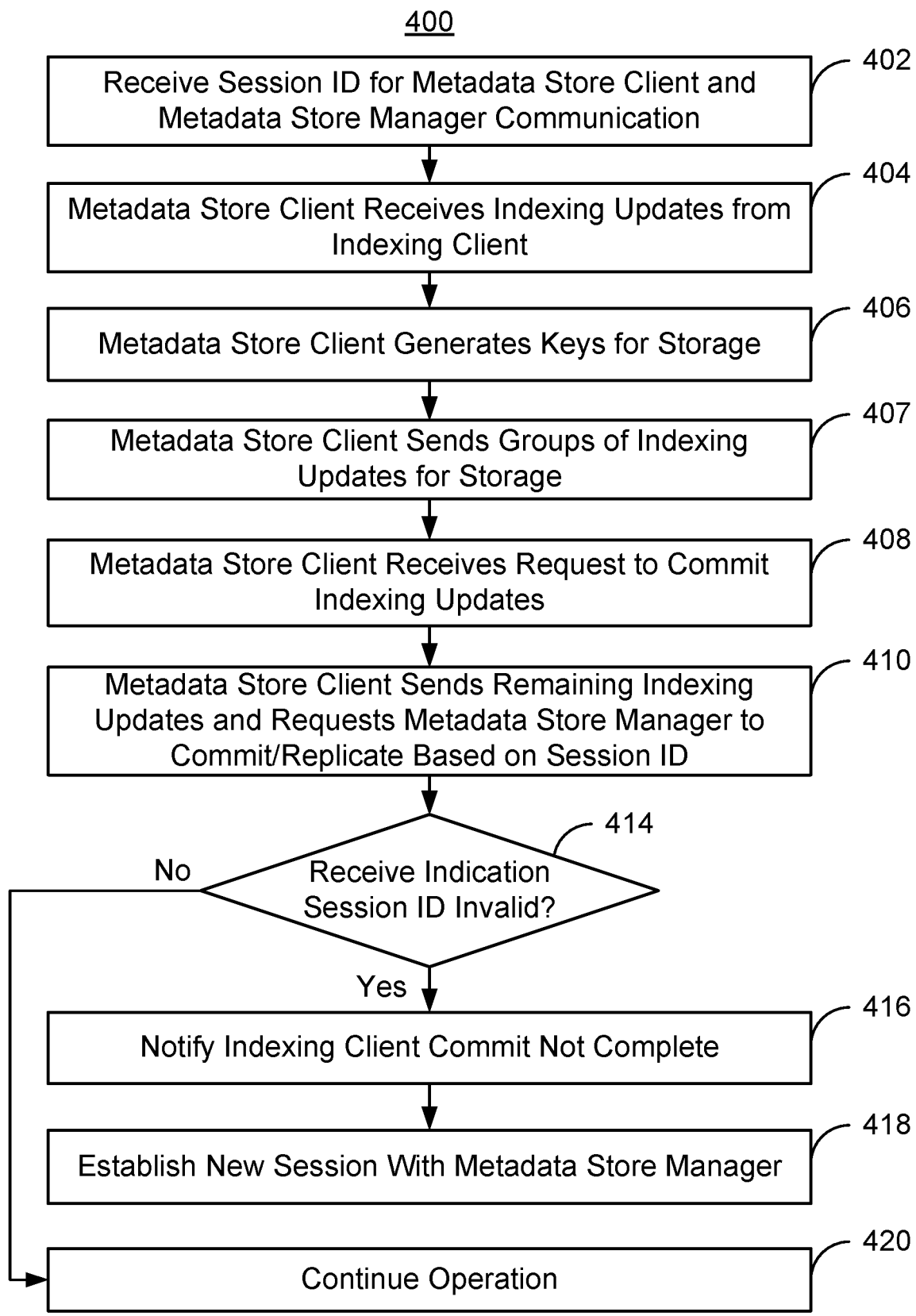
FIG. 4A is a flow chart illustrating an exemplary embodiment of a method for storing metadata.
Figure 4B:
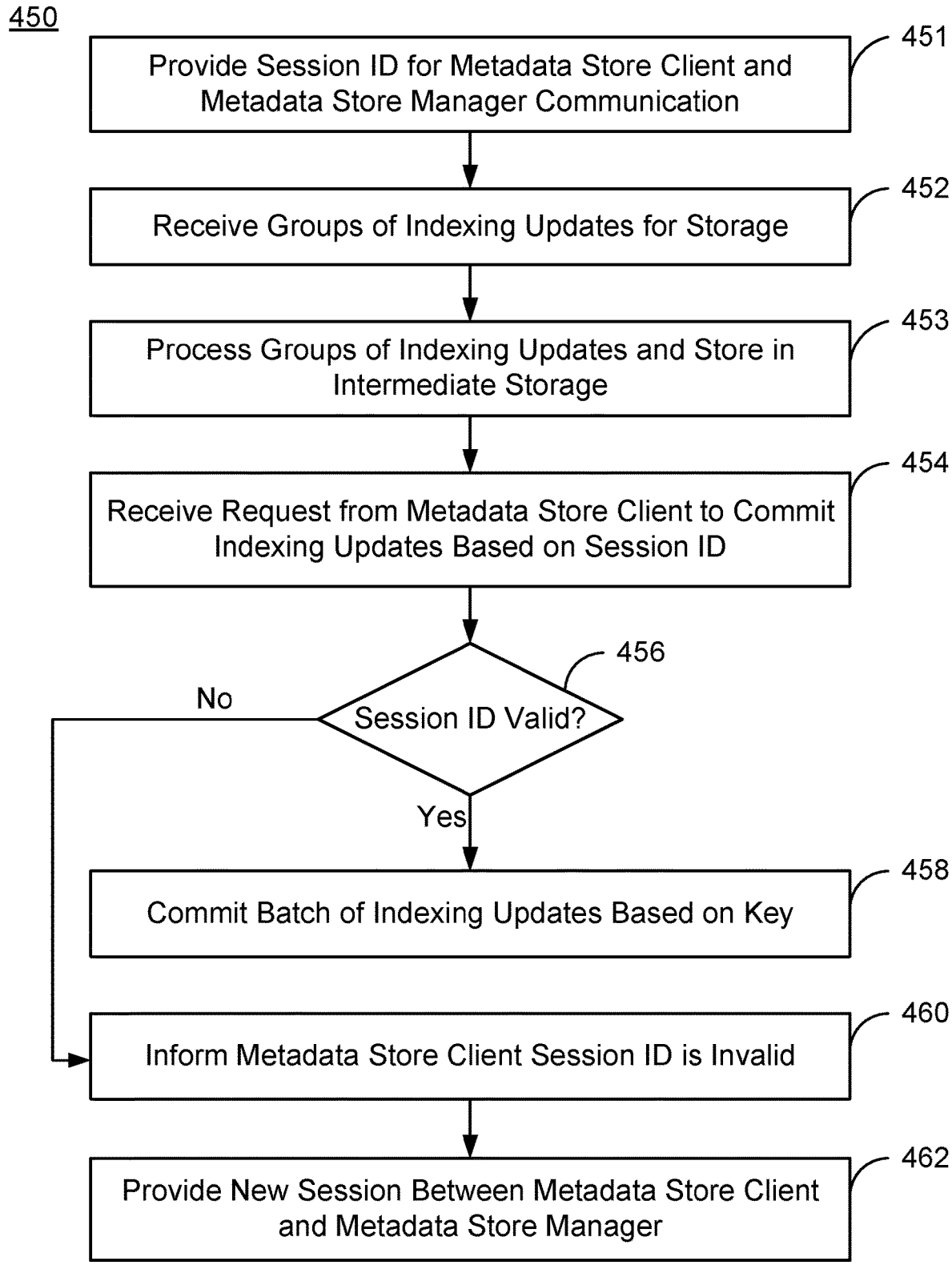
FIG. 4B depicts an exemplary embodiment of a portion of a method for indexing and storing metadata.

FIGS. 4A and 4B depict flowcharts of exemplary embodiments of methods 400 and 450 for storing metadata. FIG. 4A depicts an exemplary embodiment of method 400 for storing metadata from the perspective of the metadata store client. For clarity only some steps may be shown. Further, the steps may be performed in another order and/or include substeps. Method 400 is also described in the context of system 100 and backups using snapshots. However, in other embodiments, method 400 may be used in conjunction with another storage system (not shown) and/or another backup mechanism. For simplicity, method 400 is described in the context of indexing client 132-1, metadata store client 134, a single metadata store manager 140-1, and metadata store 150. However, method 400 may be used with multiple metadata store managers 140 and/or other components analogous to indexing client 132-1, metadata store client 134-1, metadata store manager 140-1, and metadata store 150.

A session identifier (session ID) is provided for a communication session between metadata store manager 140 and metadata store client 134-1, at 402. The session ID allows for communication between metadata store manager 140-1 and metadata store client 134-1. In some embodiments, the session ID is provided by metadata store manager 140 to metadata store client 134-1. Metadata store client 134-1 utilizes the session ID to communicate with metadata store manager 140-1 for storage of indexing updates. Metadata store client 134-1 receives indexing updates from indexing client 132-1, at 404. The same session ID may also be provided to metadata store client 134-1, which utilizes the session ID to communicate with metadata store manager 140-1 for storage of indexing updates.

Metadata store client 134-1 generates keys for storing the indexing updates and may also shard the indexing updates, at 406. In some embodiments, the key for each indexing update is based on the filename path of the data item corresponding to the indexing update. Also in 406, the appropriate bucket(s) 152 for the corresponding keys may be indicated. In some embodiments, the containers 160 and 162 may also be indicated. Thus, 406 may include sharding the indexing updates based upon the filename path and indicating that the indexing updates for data items in the same directory are to be stored in the same bucket. Metadata store client 134-1 also sends groups of indexing updates to metadata store manager 140 for storage in intermediate store 154, at 407. The indexing updates in the groups as well as the corresponding keys may be sent at 407. Also at 407, the groups may be associated with the session ID for the communication between metadata store client 134-1 and metadata store manager(s) 140.

An indication from indexing client 132-1 to commit the indexing updates is received by metadata store client 134-1, at 408. In response to the indication to commit, metadata store client 134-1 sends any remaining indexing updates received to metadata store manager(s) 140, at 410. Also at 410, metadata store client 134-1 requests that metadata store manager(s) 140 perform a commit of all indexing updates received. Thus, the indexing updates received between indications to commit (e.g. all indexing updates stored in intermediate storage 154) are associated with a batch. In some instances, all of the indexing updates may be committed to metadata store 150 together. In other embodiments, some of the indexing updates in intermediate store 154 may be committed early, as described above. However, these indexing updates may still be considered part of the same batch as indexing updates committed in response to a request to commit. The batch may also be associated with the session ID. The request to commit of 410 may be based on the session ID. Also at 410, metadata store client 134-1 may provide a request to metadata store manager(s) 140 to replicate the indexing updates across storage nodes 110 through 120.

Metadata store manager 140 determines whether the session ID is valid. The session ID may be invalid if metadata store manager 140 has crashed or otherwise failed since the session was established at 402. For example, if metadata store manager 140 recognizes the session ID, then the session ID is considered valid. If metadata store manager 140 does not recognize the session ID, for example because metadata store manager 140 has crashed, the session ID is invalid. In some embodiments, a commit operation fails in-flight because the session id changed after the commit operation was initiated but not completed. In another embodiment, metadata store client 134-1 determines whether the session ID is valid. If the session ID is valid, storage of the indexing updates continues as described below. If the session ID is not valid, the commit fails. Thus, metadata store client 134-1 determines whether an indication that the session ID is invalid is received from metadata store manager 140-1, at 414. If not, operation continues at 420.

If an indication that the session ID is invalid has been received at 414, then metadata store client 134-1 notifies indexing client 132-1 that the commit of the indexing updates in the batch was not completed, at 416. In addition, a new session is established between metadata store manager 140-1 and metadata store client 134-1, at 418. A new session ID is provided for communication between metadata store client 134-1 and metadata store manager 140-1 for storage of metadata. A new session ID may also be provided for communication between metadata store client 134-2 and metadata store manager 140-1 for storage of metadata. For example, a new session ID may be provided for communication between metadata store client 134-1 and metadata store manager 140-1 and between metadata store client 134-2 and metadata store manager 140-1 where the new session IDs for metadata store clients 134-1, 134-2 are the same.

In response to receiving a notification that the commit has not been completed, indexing client 132-1 retries for all of the indexing updates in the batch. Thus, indexing client 132-1 again provides the indexing updates to metadata store client 134-1 and requests that metadata store client 134-1 retry committing of the batch.

FIG. 4B depicts an exemplary embodiment of method 450 for storing metadata from the perspective of a metadata store manager communicating with a metadata store client. For clarity only some steps may be shown. Further, the steps may be performed in another order and/or include substeps. Method 450 is also described in the context of system 100 and backups using snapshots. However, in other embodiments, method 450 may be used in conjunction with another storage system (not shown) and/or another backup mechanism. For simplicity, method 450 is described in the context of indexing client 132-1, metadata store client 134-1, a single metadata store manager 140-1, and metadata store 150. However, method 450 may be used with multiple metadata store managers 140 and/or other components analogous to indexing client 132-1, metadata store client 134-1, metadata store manager 140-1, and metadata store 150.

A session identifier (session ID) is provided for communication between metadata store manager 140-1 and metadata store client 134-1, at 451. The session ID allows for communication between metadata store manager 140-1 and metadata store client 134-1. Metadata store client 134-1 utilizes the session ID to communicate with metadata store manager 140-1 for storage of indexing updates for traversal of a particular snapshot. Groups of indexing updates are received for storage in an intermediate store 154-1 at 452 and are processed and stored at intermediate store 154-1 of metadata store 150-1, at 453.

Any remaining indexing updates and a request to commit the indexing updates are received by metadata store manager 140-1 from metadata store client 134-1, at 454. At 454, metadata store client 134-1 may also provide a request to replicate the indexing updates across storage nodes 110 through 120.

Metadata store manager 140-1 determines whether the session ID is valid, at 456. For example, metadata store manager 140-1 may determine whether the session ID is recognized. If metadata store manager 140-1 crashed since the session was established at 402, metadata store manager 140-1 may lose the information related to the session; in this case, metadata store manager 140-1 would not recognize the session ID and would determine the session ID invalid. If the session ID is valid, metadata store manager 140-1 requests that metadata store 150 commit indexing updates in intermediate store 154. Thus, metadata store commits the indexing updates to buckets 152 of metadata store 150, at 458. The indexing updates are batched together for the commit. For example, the batch of indexing updates to be committed may include the indexing updates that have been provided by metadata store client 134-1 and which have not been committed. In some embodiments, all indexing updates, including those from metadata store client 134-2, are batched and committed based on the request received by metadata store client 140-1. In some embodiments, this process includes metadata store manager 140-1 requesting metadata store 150-1 to commit all indexing updates in intermediate store 154-1. Indexing updates that have undergone an early commit and were received since a previous indication to commit may be considered part of this batch.

Committing may include not only storing the original indexing updates, but also storing replicas of the indexing updates based on the request to replicate from metadata store client 134-1. For example, the indexing updates may be stored in certain buckets 152 based upon the filename path such that indexing updates for data items in the same directory are stored in the same bucket 152. This storage of indexing updates may be based on the keys for the indexing updates. In addition, replica(s) of the indexing updates may be stored in other buckets 152 on other storage node(s).

If it is determined in 456 that the session ID is invalid, then metadata store manager 140-1 notifies metadata store client 134-1, at 460. In addition, a new session is established between metadata store manager 140-1 and metadata store client 134-1, at 462. A new session ID is generated for communication between metadata store client 134 and metadata store manager 140-1 for storage of metadata. Metadata store client 134-1 notifies indexing client 132-1 that the commit of the indexing updates was not completed and the obtaining and storing of indexing updates in the batch may be retried.

Using methods 400 and 450, storage and use of metadata may be improved. Because the indexing updates are batched and performed in response to established requests from the indexing client, writing the metadata may be more efficient. Use of buckets 152 in the metadata store may improve the scalability of methods 400 and 450 and system 100. Storage of metadata based upon the filename path and such that metadata for data items in a particular directory are stored in the same bucket may improve write efficiency, read efficiency of metadata, and browsing of metadata. Use of the session ID may improve the fault tolerance of system 100. Consequently, performance may be improved.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the above-described description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a batch of a plurality of different indexing updates of a data repository associated with a secondary storage system configured to perform a backup of a primary storage system;
sending at least a first portion of the batch of the plurality of different indexing updates for storage, wherein the batch of the plurality of different indexing updates is associated with a session identifier, wherein the at least the first portion of the batch of the plurality of different indexing updates are stored in an intermediate store for temporary storage, wherein a metadata store manager commits the first portion of the batch of the plurality of different indexing updates from the intermediate store to a first data bucket of a metadata store in response to an occurrence of at least one commitment factor, wherein the at least one commitment factor is associated with a particular fraction of the intermediate store being full;

receiving a second portion of the batch of the plurality of different indexing updates;

sending the second portion of the batch of the plurality of different indexing updates for storage and a request to commit the second portion of the batch of the plurality of different indexing updates, wherein the metadata store manager determines that that the session identifier associated with the batch of the plurality of different indexing updates is invalid;

receiving from the metadata store manager an indication that the session identifier associated with the batch of the plurality of different indexing updates is invalid;

establishing a new communication session with the metadata store manager, wherein the new communication session is associated with a new session identifier; and sending to the metadata store manager a request to commit the first portion and the second portion of the batch of the plurality of different indexing updates, wherein in response, the metadata store manager commits in a second data bucket of the metadata store the first portion and the second portion of the batch of the plurality of different indexing updates.

2. The method of claim 1, wherein the request to commit the second portion of the plurality of different indexing updates is based on the session identifier associated with the batch.

3. The method of claim 2, further comprising
in response to the indication, providing to an indexing client, a second indication that the commit of the second portion of the plurality of different indexing updates is not completed.

4. The method of claim 1, wherein the sending the first portion of the batch of the plurality of indexing updates for storage further includes:
grouping the first portion of the batch of the plurality of different indexing updates into a group; and
sending the group for storage, wherein the group is stored in the intermediate store.

5. The method of claim 1, further comprising associating at least the first portion of the batch of the plurality of different indexing updates corresponding to data items of a particular directory of the primary storage system with the first data bucket among a plurality of data buckets of the metadata store, the first data bucket corresponding to the particular directory.

6. The method of claim 5, wherein associating at least the first portion of the batch of the plurality of different indexing updates with the first data bucket includes associating at least the first portion of the batch of the plurality of different indexing updates with a key corresponding to the first data bucket.

7. The method of claim 1, further comprising determining a key for each of the plurality of different indexing updates based on a filename path of a corresponding primary storage system file of the corresponding indexing update.

8. The method of claim 7, wherein the key for each of the plurality of different indexing updates is configured to allow viewing at the metadata store of a filename of the corresponding primary storage system file of the corresponding indexing update.

9. The method of claim 1, further comprising receiving from an indexing client at a metadata store client, the indication to perform the commit of the second portion of the plurality of different indexing updates,
wherein the receiving the batch of the plurality of different indexing updates includes receiving the batch of the plurality of different indexing updates from the indexing client at the metadata store client,
wherein the sending the at least the first portion of the batch of the plurality of different indexing updates further includes sending the at least the first portion from the metadata store client to the metadata store manager, and
wherein the sending the request to commit the second portion of the plurality of different indexing updates further includes the metadata store client sending a request to commit to the metadata store manager.

10. The method of claim 1, wherein the request to commit the second portion of the plurality of different indexing updates further includes requesting replication of at least the second portion of the plurality of different indexing updates to multiple locations of the metadata store.

11. The method of claim 1, wherein the commitment factor further includes a particular time interval expiring.

12. A system, comprising:
a hardware processor configured to:
receive a batch of a plurality of different indexing updates of a data repository associated with a secondary storage system configured to perform a backup of a primary storage system;
send at least a first portion of the batch of the plurality of different indexing updates for storage, wherein the batch of the plurality of different indexing updates is associated with a session identifier, wherein the at least the first portion of the batch of the plurality of different indexing updates are stored in an intermediate store for temporary storage wherein a metadata store manager commits the first portion of the batch of the plurality of different indexing updates from the intermediate store to a first data bucket of a metadata store in response to an occurrence of at least one commitment factor, wherein the at least one commitment factor is associated with a particular fraction of the intermediate store being full;
receive a second portion of the batch of the plurality of different indexing updates;
send the second portion of the batch of the plurality of different indexing updates for storage and a request to commit the second portion of the plurality of different indexing updates, wherein the metadata store manager determines that that the session identifier associated with the batch of the plurality of different indexing updates is invalid;
receive from the metadata store manager an indication that the session identifier associated with the batch of the plurality of different indexing updates is invalid;
establish a new communication session with the metadata store manager, wherein the new communication session is associated with a new session identifier; and
send to the metadata store manager a request to commit the first portion and the second portion of the batch of the plurality of different indexing updates, wherein in response, the metadata store manager commits in a second data bucket of the metadata store the first portion and the second portion of the batch of the plurality of different indexing updates; and a memory coupled to the hardware processor and configured to provide the hardware processor with instructions.

13. The system of claim 12, wherein the request to commit the second portion of the plurality of different indexing updates is based on the session identifier associated with the batch.

14. The system of claim 13, wherein the hardware processor is further configured to
in response to the indication, provide to an indexing client a second indication that the commit is not completed.

15. The system of claim 12, wherein to send the at least the first portion of the batch of the plurality of indexing updates for storage the hardware processor is further configured to:
group the first portion of the batch of the plurality of different indexing updates into a group; and
send the group for storage, wherein the group is stored in the intermediate store.

16. The system of claim 12, wherein the hardware processor is further configured to associate at least the first portion of the batch of the plurality of different indexing updates corresponding to data items of a particular directory of the primary storage system with the first data bucket among a plurality of data buckets of the metadata store, the first data bucket corresponding to the particular directory.

17. The system of claim 16, wherein the hardware processor is configured to associate the at least the first portion of the batch of the plurality of different indexing updates with the first data bucket by being configured to associate the at least the first portion of the batch of the plurality of different indexing updates with a key corresponding to the first data bucket.

18. The system of claim 12, wherein the hardware processor is further configured to determine a key for each of the plurality of different indexing updates based on a filename path of a corresponding primary storage system file of the corresponding indexing update.

19. The system of claim 18, wherein the key for each of the plurality of different indexing updates is configured to allow viewing at the metadata store of a filename of the primary storage system file corresponding to the each of the plurality of different indexing updates.

20. The system of claim 12, wherein to receive the batch of the plurality of different indexing updates the hardware processor is further configured to receive the batch of the plurality of different indexing updates from an indexing client at a metadata store client,
wherein to send the at least the first portion of the batch of the plurality of different indexing updates the hardware processor is further configured to send the at least the first portion from the metadata store client to the metadata store manager,
wherein to receive the indication to perform the commit the hardware processor is further configured to receive the indication to perform the commit from an indexing client at the metadata store client, and
wherein to send the request the commit the second portion of the plurality of different indexing updates, the hardware processor is further configured to send the request to commit from the metadata store client to the metadata store manager.

21. The system of claim 12, wherein to request the commit of the second portion of the plurality of different indexing updates, the hardware processor is configured to:
request replication of at least the second portion of the plurality of different indexing updates to multiple locations of the metadata store.

22. A computer program product, the computer program product being embodied in a non-transitory computer readable storage medium and comprising computer instructions for:
receiving a batch of a plurality of different indexing updates of a data repository associated with a secondary storage system configured to perform a backup of a primary storage system;
sending at least a first portion of the batch of the plurality of different indexing updates for storage, wherein the batch of the plurality of different indexing updates is associated with a session identifier, wherein the at least the first portion of the batch of the plurality of different indexing updates are stored in an intermediate store for temporary storage, wherein a metadata store manager commits the first portion of the batch of the plurality of different indexing updates from the intermediate store to a first data bucket of a metadata store in response to an occurrence of at least one commitment factor, wherein the at least one commitment factor is associated with a particular fraction of the intermediate store being full;
receiving a second portion of the batch of the plurality of different indexing updates;
sending the second portion of the batch of the plurality of different indexing updates for storage and a request to a commit the second portion of the plurality of different indexing updates, wherein the metadata store manager determines that the session identifier associated with the batch of the plurality of different indexing updates is invalid;
receiving from the metadata store manager an indication that the session identifier associated with the batch of the plurality of different indexing updates is invalid;
establishing a new communication session with the metadata store manager, wherein the new communication session is associated with a new session identifier; and
sending to the metadata store manager a request to commit the first portion and the second portion of the batch of the plurality of different indexing updates, wherein in response, the metadata store manager commits in a second data bucket of the metadata store the first portion and the second portion of the batch of the plurality of different indexing updates.

* * * * *